Dec. 12, 1961 W. C. FOSTER 3,012,283
SHAPING POLYURETHANE PLASTICS
Filed July 1, 1957

INVENTOR:
William C. Foster
Clelle W. Upchurch
BY
ATTORNEY

United States Patent Office 3,012,283
Patented Dec. 12, 1961

3,012,283
SHAPING POLYURETHANE PLASTICS
William C. Foster, Cuyahoga Falls, Ohio, assignor to Mobay Chemical Company, St. Louis, Mo., a corporation of Delaware
Filed July 1, 1957, Ser. No. 669,119
4 Claims. (Cl. 18—48)

This invention relates generally to the manufacture of cellular articles and more particularly to an improved method for permanently shaping the surface of a slap of polyurethane plastic.

It has been proposed heretofore to make cushions, pillows, topper pads, and the like having at least one curved surface from cellular polyurethane plastics. Such articles have been made by cutting a slab of cured cellular polyurethane plastic to the desired shape with heated wires, knives, or other suitable cutting instruments or by pressing and heating a slab of cured polyurethane in a closed mold of the desired size and shape. Those articles shaped by cutting usually have a cellular surface but it is very difficult if not possible to produce a curved surface by such a process. While almost any configuration can be imparted to cellular polyurethane slabs by simultaneously heating and pressing in a closed mold, high temperatures of about 300° F. or more for several hours are required and the cellular structure of the surface of the slab may be fused and substantially impervious. Polyurethane cushions, pillows and the like formed by foaming in a mold have a substantially impervious surface and since they do not "breathe" they are uncomfortable, particularly at summer temperatures.

It is therefore an object of this invention to provide an improved method of curving the surface of a cellular polyurethane plastic slab. Another object of the invention is to provide an improved method for making articles having at least one curved surface from a slab of cellular polyurethane plastic. Still another object of the invention is to provide a method for making articles having at least one curved surface from a slab of cellular polyurethane plastic without destroying any substantial number of the cells in the surface. A further object of the invention is to provide a method for making cushions, pillows and the like having a pervious surface and having at least one curved surface from a slab of cellular polyurethane plastic. A still further object of the invention is to provide a method for making cushions, pillows and the like from a slab of cellular polyurethane plastic which retains the desirable pervious surface of a cellular polyurethane. Still another object is to provide an improved method for contouring or shaping cellular polyurethane plastics at relatively low temperatures.

Other objects will become apparent from the following description with reference to the accompanying drawing in which FIGURE 1 is a perspective view of an apparatus suit- for practicing the invention containing a molded article suitable for use as a cushion;

Figure 1:
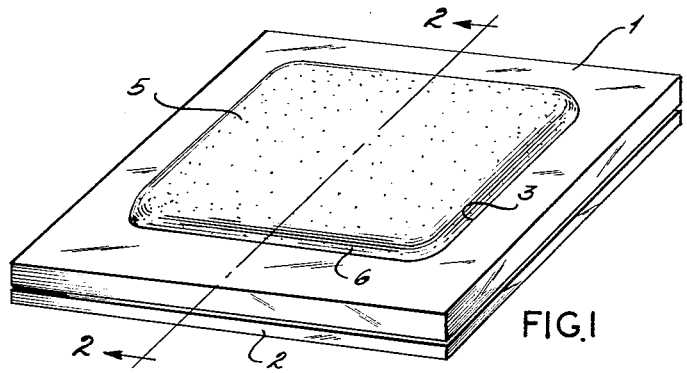

The foregoing objects as well as others are accomplished in accordance with this invention, generally speaking, by providing a method for shaping cellular polyurethane plastics after chemical reaction between the chemical components to form a solid cellular polyurethane but before complete curing of the plastic. The invention provides a process especially advantageous for forming a curved margin, rim or edge on a cellular polyurethane plastic slab whereby a band along the edge of a slab of cellular polyurethane plastic is compressed before it is completely cured to a thickness less than that of the adjoining portion of the slab until substantially complete curing or substantially final setting of the polyurethane plastic without compressing any substantial area of the remainder of the slab.

It is also advantageous, however, to shape cellular polyurethanes into products of various other configurations during the critical period between initial formation of the cellular product and complete curing, so such embodiments are within the purview of the invention. For example, a perpendicular surface of a slab of cellular polyurethane may be converted into a permanently set sloping surface by compressing the perpendicular surface to the desired shape before the polyurethane is completely cured and holding it in that shape until substantially completely cured.

In making an article having at least one curved surface in accordance with this invention, a slab of uncured, flexible, or elastic cellular polyurethane plastic which is somewhat larger than the desired finished article is provided. The slab is then compressed only along those edges to be curved, one or more, depending upon the number of curved rims desired, and maintained in the pressed conditions until substantially complete curing. The width of the band compressed along each edge of the slab that is to be curved is dependent upon the difference in dimensions between the slab and desired curved article, since only the excess length or width of slab over the desired dimensions of the curved article is compressed. It is, of course, necessary to provide a band for compression sufficiently wide to be pressed without any substantial slippage in order to fabricate an article to predetermined dimension specifications. The remainder of the slab not contacted by the mold retains its open cellular structure.

In shaping a slab of cellular polyurethane plastic by embossing or molding into any desired configuration, the slab is pressed to shape during the critical period between initial formation and complete curing and held in the desired position until substantially complete curing or until curing has progressed to the point that the desired shape will be retained after the pressure is removed.

The invention is predicated upon the discovery that cellular polyuretane plastics will retain indefinitely the shape they possess during the curing of the plastic. Cellular polyurethane plastics are prepared by chemical reaction between an organic polyisocyanate, an organic compound having at least two reactive hydrogen atoms, and water. The polyisocyanate reacts with the organic compound having at least two reactive hydrogen atoms to join molecules of the latter compound together and produce a compound or prepolymer of greater molecular weight having urethane linkages resulting from the reaction of an isocyanate group with a reactive hydrogen atom of the other compound. Water reacts with the isocyanate groups of the prepolymer to form urea linkages and carbon dioxide. The urea linkages "cross-link" or extend the chain while the carbon dioxide along with carbon dioxide formed through reaction between water and the isocyanate groups of any unreacted polyisocyanate in the mixture forms bubbles in the viscous reaction liquid and is trapped therein. The reaction liquid sets or hardens to produce a cellular product. The chemical reactions involved in the manufacture of cellular polyurethanes are represented by the following equations:

(1)
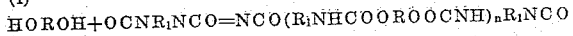
$$HOROH + OCNR_1NCO = NCO(R_1NHCOOROOCNH)_nR_1NCO$$

(2)
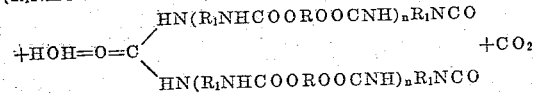
$$NCO(R_1NHCOOROOCNH)_nR_1NCO + HOH = O=C\begin{array}{c}HN(R_1NHCOOROOCNH)_nR_1NCO\\ \\ HN(R_1NHCOOROOCNH)_nR_1NCO\end{array} + CO_2$$

wherein HOROH is an organic compound having at least two reactive hydrogen atoms, such as, for example, a polyester, polyalkylene ether glycol, polythioether glycol, polyester amide, or the like and $OCNR_1NCO$ is any suitable organic polyisocyanate. In reaction (1) more polyisocyanate than required to react with all the OH groups of the organic compound having at least two reactive hydrogen atoms is used to provide a prepolymer having terminal NCO groups. Although the cellular product obtained in reaction (2) is a solid, as contrasted to a liquid, it undergoes further chemical reaction to form a substantially tack-free product. This latter change in characteristics is known as "aging," "curing," or "setting" of the cellular product. The actual chemical reactions involved during the curing are not definitely known, but it is believed that chemical reaction involving the isocyanate groups and the reactive hydrogen atoms present in the urea linkages may be occurring. In any event, the cellular product obtained in (2) is raw or uncured and will gradually cure or set upon standing. Complete curing can be achieved in this way, or it may be accelerated by heating. The process provided by this invention requires that the edges of the cellular product to be curved be compressed before final curing or setting. Preferably, the cellular product is compressed within from about 30 minutes to 3 hours after chemical reaction between the water and prepolymer is no longer visible. However, with some formulations and processing techniques the cellular polyurethane may be compressed substantially immediately while others should not be compressed earlier than 15 minutes after evidence of chemical reaction is no longer apparent. In almost all instances, curing will be complete within 8 hours after the cellular product is formed. It is to be understood, however, that the curing time will vary with variations in composition and techniques and that the cellular polyurethane can be compressed to form curved surfaces in accordance with this invention any time between its preparation and substantially complete curing. In order that the article will retain its curved surface indefinitely, the edge must be maintained in the compressed state until curing is substantially complete.

The process of the invention may be practiced by supporting one side of a slab of cellular polyurethane plastic and compressing the edges of the opposite side of the slab with a frame having an opening therein of substantially the same shape and dimensions as those desired in the finished article by moving the frame toward the support. In this way only the band or bands of plastic covered by the frame are pinched between the frame and the support, the remainder of the slab protruding through the opening in the frame. As pressure is applied to the frame, it moves towards the support, compressing the band of cellular polyurethane lying therebetween, and a rounded or curved edge or surface is formed between the exposed surface of the slab lying within the opening and the band that is compressed. Any amount of compression will result in some curving along the edges, but usually to produce a cushion, pillow or similar article, the band of the slab should be compressed to a thickness of from about 10% to about 80% of its original thickness. Of course, depending upon the shape desired, compression may be stopped at any thickness less than that of the uncompressed slab. The band or bands along the edge or edges of the slab are maintained in the compressed state until substantially completely cured. The curing rate can be accelerated by heating the cellular polyurethane to any temperature below the decomposition point. Usually, however, the cellular product is maintained at a temperature within the range of from about 20° C. to about 100° C. during the curing stage of the process.

A product having curved edges, rims, or margins along opposing surfaces may be made by the procedure described in the immediate foregoing with the exception that the band along the edge of the slab is compressed between two frames with the remainder of the slab being permitted to protrude into the opening in each frame. In other words, a second frame is used as the support. In either instance, whether two frames are used or a frame and an imperforate member are used in the shaping process, the compressed band or web does not spring back after the pressure is removed. This band or web may be removed by any suitable means such as cutting with a knife, die, shears or other suitable implement.

As indicated hereinbefore, the process provided by this invention is applicable to the shaping of any resilient or elastic cellular polyurethane plastic. It may have been formed by reacting any suitable organic compound having at least two reactive hydrogen atoms, a molecular weight of at least 500, and an hydroxyl number of not more than 225, such as, for example, a polyester, a polyalkylene ether glycol, a polythioether glycol, a polyester amide, or the like with an organic polyisocyanate and water. Any suitable organic polyisocyanate may be used such as, for example, ethylene diisocyanate, ethylidene diisocyanate, propylene-1,2-diisocyanate, butylene-1,3-diisocyanate, hexylene-1,6-diisocyanate, cyclohexylene-1,2-diisocyanate, m-phenylene diisocyanate, 2,4-tolylene diisocyanate, 1,6-tolylene diisocyanate, 3,3'-diphenyl-4,4'-biphenylene diisocyanate, 3,3'-dichloro-4,4'-biphenylene diisocyanate, triphenylmethane triisocyanate, 1,5-naphthylene diisocyanate, or the like.

Any suitable method and apparatus may be used for mixing the organic polyisocyanate with the organic compound having at least two reactive hydrogen atoms and the water to prepare the polyurethane, but it is preferred to mix these components together in accordance with the process disclosed in U.S. Patent 2,764,565 granted to Hoppe et al., September 25, 1956. After the components have been mixed together, they are discharged into a suitable mold or other shaping device where chemical reaction proceeds and the cellular product is formed. The resulting product has a substantially impervious surface so it is cut by any suitable method, such as, sawing, or by means of heated wires to remove the undesirable surface and into slabs of the desired dimensions. Usually the cellular product must set for a few minutes, of, say, at least about 15 minutes, before it can be satisfactorily cut.

Referring now to the drawing, a mold having a frame 1, an imperforate supporting surface 2, and opening 3 is illustrated in FIGURE 1. In forming a curved surface on a slab of cellular polyurethane plastic with the apparatus of FIGURE 1, slab 5 of elastic cellular polyurethane plastic is placed on support 2. The slab 5 must be of greater dimensions than opening 3 in frame 1. Frame 1 is pressed against a band 4 of the upper surface of the slab 5 and forced downwardly until the thickness of the band 4 has been reduced from about 20% to about 90%. In other words, the pressure is sufficiently great to produce a band thickness of from about 10% to about 80% of the thickness of the remainder of the slab. As band 4 is compressed, the edge 6 formed on the slab between band 4 and the remainder thereof is curved as shown to best advantage in FIGURES 2 and 3. The slab 5 of foam must have been uncured and it is maintained in the compressed state until curing has been brought about. The assembly may be placed in an oven and heated at an elevated temperature of up to about 100° to accelerate the curing process, or it may be permitted to stand at ambient temperatures until cured. After curing the frame 1 is removed and the web 4 about the resulting cellular polyurethane article is removed by cutting. The edges or rim 6 are permanently curved. The particular apparatus shown in FIGURE 1 has been found advantageous for making cushions having one substantially flat surface with substantially right-angle edges and an opposing surface with curved edges.

Figure 2:
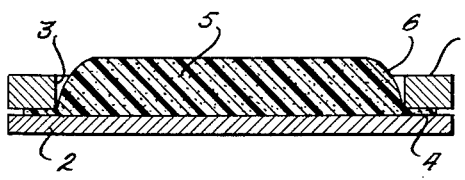
FIGURE 2 is a cross-section of an embodiment of the invention taken along the line 1—1 of FIGURE 1.

FIGURE 2 is a cross-section of the apparatus of FIGURE 1 having the imperforate support 2. Cellular polyurethane slab 5 projects outwardly through the opening 3 in frame 1 and a curved edge 6 is formed as the band 4 is compressed to about 10% of the thickness of the remainder of the slab 5.

Figure 3:
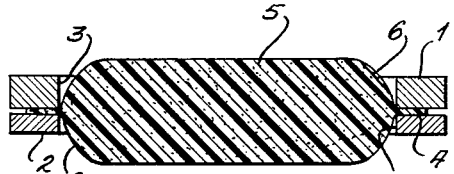
FIGURE 3 is a cross-section of another embodiment of the invention taken along the line 1—1 of FIGURE 1.

The apparatus shown in FIGURE 3 provides a cellular polyurethane product having curved edges on opposing surfaces. As shown in the drawing, band 4 is compressed between two frames, each having an opening 3. The remainder of the cellular polyurethane slab 5 protrudes through the opening 3 in frames 1 and 2. In this way both surfaces of the article are provided with curved edges.

Figure 4:
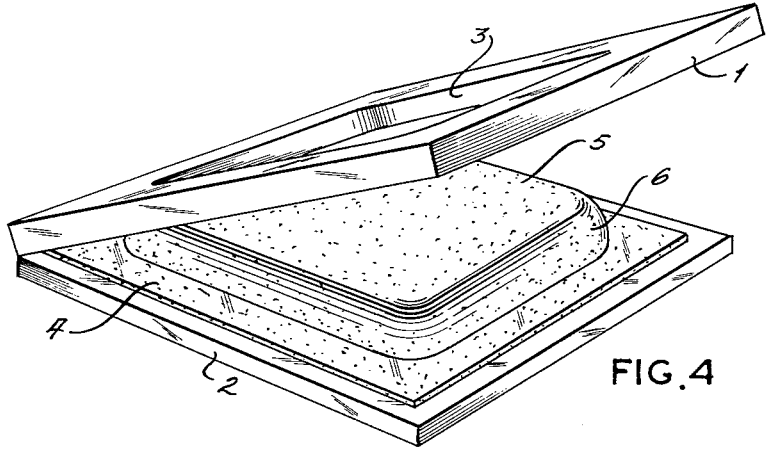
FIGURE 4 is a perspective view of an embodiment of the invention showing the mold in a partially open position.

FIGURE 4 illustrates in a perspective view a slab 3 of cellular polyurethane plastic having rounded edges or rim 6 and of a shape suitable for a cushion. In this instance, support 2 is an imperforate surface so the underside of slab 3 has right angle edges instead of curved edges. Web 4 is removed by any suitable cutting means, such as with a knife or saw.

Figure 5:
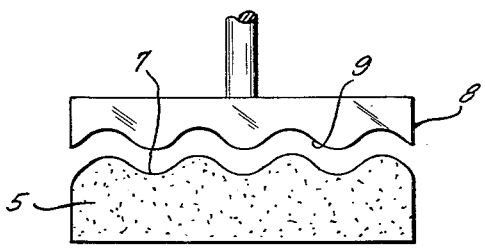
FIGURE 5 is an illustration of a slab of cellular polyurethane shaped in accordance with an embodiment of this invention and of a device suitable for shaping the slab.

FIGURE 5 illustrates diagrammatically a slab of cellular polyurethane 5 having curved edges 6 and a plurality of ridges 7 formed by pressing a slab with device 8 having projections 9. The slab is compressed with device 8 between the formation of the solid cellular polyurethane but before complete curing and compression is maintained until substantially complete curing. Device 8 may be heated to temperatures of up to about 100° C.

In order better to describe and further clarify the invention, the following are typical embodiments thereof:

Example 1

About 100 parts by volume of a polyester prepared from 16 mols adipic acid, 16 mols diethylene glycol, and 1 mol trimethylolpropane are mixed in a suitable tank with about 25 parts tolylene-2,6-diisocyanate and stirred to bring about substantially intimate mixing thereof. The resulting mixture is then pumped into a suitable reaction or mixing device, such as that disclosed in U.S. Patent 2,764,565, at a rate of about 2 liters per minute. An activator mixture containing about 3 parts by volume adipic acid ester of N-diethylaminoethanol, about 2 parts ammonium oleate, and about 1.2 parts water is injected into the stream of polyester-isocyanate mixture in the mixing chamber and the resulting mixture is stirred by means of an agitator to insure rapid intimate mixing of the components. The resulting mixture is then substantially immediately discharged into a mold where chemical reaction proceeds with accompanying expansion of the reaction mixture into a solid cellular polyurethane product. After about 10 to 15 minutes, the resulting block of cellular polyurethane plastic is cut into the desired sized slab, care being taken to remove any noncellular skin formed on the surface of the polyurethane plastic. The slab is then placed in a suitable mold of the type disclosed in FIGURE 1 and bands along the edges of the slab are compressed as illustrated in FIGURE 1 before complete curing of the polyurethane plastic to a thickness of from about 10% to about 25% of the thickness of the remainder of the slab. Compression is maintained on the bands until the polyurethane plastic is substantially completely cured and will retain the compressed condition after removal of the mold. Curing is accelerated by heating to about 80° C.

Example 2

About 100 parts by weight of a polyalkylene ether glycol prepared by condensing propylene oxide and having a molecular weight of about 2,000 are mixed with about 3 parts by weight trimethylolpropane and about 0.02 part benzoyl chloride. This mixture is heated to about 60° C. and about 36 parts of an 80/20 mixture of 2,4-tolylene diisocyanate, 2,6-tolylene diisocyanate are added. The resulting mixture is stirred and heated to a temperature of about 90° C. to about 100° C. until substantially complete reaction to form a prepolymer having terminal isocyanate groups. This prepolymer, along with any unreacted tolylene diisocyanate present in the mixture, is pumped into a suitable mixing chamber such as the device disclosed in U.S. Patent 2,764,565 and about 1.5 parts water are injected into the stream of prepolymer. From about 2 to about 4 parts ethyl morpholine are also injected into the flowing stream of prepolymer either in admixture with the prepolymer or in a separate stream. After complete mixing, the liquid is discharged into a suitable mold where chemical reaction proceeds and a cellular polyurethane product is formed. After about 15 minutes the product is cut into the desired slabs with the removal of any surface skin formed during the molding process and the resulting slab is compressed as illustrated in FIGURES 1 and 3 to form a polyurethane product having curved marginal edges on opposite surfaces thereof.

It is to be understood that the process provided by this invention is adaptable to the contouring or shaping of any polyurethane plastic which is sufficiently resilient after initial formation and before final curing to be compressed without rupturing and adapted to retain the compressed state after complete curing. Thus, any polyurethanes which are resilient during the curing period may be shaped in accordance with this invention even though they may later become permanently rigid or too brittle to be compressed without rupturing.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. A method of shaping a cellular polyurethane plastic which comprises forming a foamable polyurethane reaction mixture, allowing the mixture to expand and form a cellular polyurethane plastic, allowing the product to cure partially but only to the extent that it is resilient and it can be cut, cutting the partially cured product to expose open cells on the surface thereof, pressing only the marginal portions of the resulting open-celled polyurethane plastic to a thickness less than the thickness of the remainder thereof while it is in the partially cured state, maintaining the pressure on the said marginal portions until the said polyurethane has completely cured, thereafter releasing the pressure and cutting the marginal portions from the remainder thereof, whereby a shaped open-celled product is obtained.

2. The process of claim 1 wherein the marginal edges are pressed to a thickness of from about 10 percent to about 80 percent of the thickness of the remainder of said polyurethane plastic.

3. The process of claim 1 wherein the marginal portion is maintained at a temperature of from about 20° C. to about 100° C. during the time it is pressed.

4. The process of claim 1 wherein the marginal portion is separated from the remainder of the polyurethane plastic after the pressure has been released.

(References on following page)

References Cited in the file of this patent

UNITED STATES PATENTS

| | | |
|---|---|---|
| 2,021,647 | Miller | Feb. 23, 1937 |
| 2,103,003 | Fischer | Dec. 21, 1937 |
| 2,575,259 | Cox et al. | Nov. 13, 1951 |
| 2,617,751 | Bickett | Nov. 11, 1952 |
| 2,802,240 | Thomas | Aug. 13, 1957 |
| 2,827,665 | Rogers et al. | Mar. 25, 1958 |

FOREIGN PATENTS

| | | |
|---|---|---|
| 944,285 | Germany | June 14, 1956 |

OTHER REFERENCES

Du Pont periodical, Urethane Resilient Foams Made From Polyesters, Feb. 15, 1956, Elastomers, Div. Hr-10.

"Product Engineering," Foamed Isocyanates, Formation, Properties, Applications, Feb. 1955, vol. 26, No. 2, pp. 140–143.

Hopkins: Polyester-Urethane Foams, a Preliminary Survey of Formulation Factors, "Rubber Age," vol. 78, Nov. 1955, pp. 239–244, 248.

Carey et al.: Mechanical action of flexible foams, "Modern Plastics," Tech. Sec., Aug. 1956, pp. 139–140, 142, 144, 146, 226, 229.